US 6,550,802 B2

(12) United States Patent
Sheehan

(10) Patent No.: US 6,550,802 B2
(45) Date of Patent: Apr. 22, 2003

(54) EXPANDABLE JOGGING STROLLER

(76) Inventor: Merry Sheehan, 51 Pine Haven Cir., Rockland, MA (US) 02370

( * ) Notice: Subject to any disclaimer, the term of this patent is extended or adjusted under 35 U.S.C. 154(b) by 0 days.

(21) Appl. No.: 09/971,951

(22) Filed: Oct. 5, 2001

(65) Prior Publication Data
US 2002/0070531 A1 Jun. 13, 2002

Related U.S. Application Data
(60) Provisional application No. 60/238,117, filed on Oct. 6, 2000.

(51) Int. Cl.[7] .................................................. B62B 7/06
(52) U.S. Cl. ........................ 280/658; 280/647; 280/62
(58) Field of Search ............................. 280/47.38, 642, 280/650, 652, 657, 658, 647, 648, 638, 62; 180/906; 301/128

(56) References Cited

U.S. PATENT DOCUMENTS

| 1,560,802 | A | * | 11/1925 | Julstedt | 280/38 |
| 2,471,462 | A | * | 5/1949 | Toth | 280/653 |
| 3,722,904 | A | * | 3/1973 | Puckett | 280/653 |
| 3,881,739 | A | * | 5/1975 | Laune | 280/42 |
| 4,570,956 | A | * | 2/1986 | Dyer | 280/30 |
| 4,796,909 | A | * | 1/1989 | Kirkendall | 280/651 |
| 5,106,113 | A | * | 4/1992 | Piacentini | 280/47.21 |
| 5,236,060 | A | * | 8/1993 | Huber | 180/210 |
| 5,536,033 | A | * | 7/1996 | Hinkston | 280/642 |
| 5,562,300 | A | | 10/1996 | Nelson | |
| 5,695,212 | A | | 12/1997 | Hinkston | |
| 5,743,552 | A | * | 4/1998 | Baechler et al. | 280/642 |
| D402,597 | S | | 12/1998 | Everett | |
| 5,934,757 | A | * | 8/1999 | Smith | 297/452.13 |
| D418,780 | S | * | 1/2000 | Everett et al. | D12/129 |
| 6,139,045 | A | * | 10/2000 | Vandenbark et al. | 280/638 |
| 6,193,263 | B1 | * | 2/2001 | Lin | 280/643 |
| 6,209,892 | B1 | * | 4/2001 | Schaaf et al. | 280/33.993 |
| D452,191 | S | * | 12/2001 | Carpenter | D12/129 |
| D452,194 | S | * | 12/2001 | Stohr et al. | D12/129 |
| D452,195 | S | * | 12/2001 | Baechler | D12/129 |
| 6,431,579 | B1 | * | 8/2002 | Kaneko et al. | 280/642 |

* cited by examiner

Primary Examiner—Brian L. Johnson
Assistant Examiner—Kelly E Campbell
(74) Attorney, Agent, or Firm—D. Michael Burns

(57) ABSTRACT

A three wheel jogging stroller having a conversion kit for enabling the stroller to be interchangeable between a single seat and a double seat model. The conversion requiring only the installation of a insert into the handlebar and an insert into the rear axle with a center bar between the handlebar and the front end and a connecting brace between the handlebar and rear axle. The center bar providing support for both seats. Pivoting means for the structural rods and handlebar extensions all being built into the basic stroller chassis. The entire conversion being performed without the need of any auxiliary tools.

10 Claims, 5 Drawing Sheets

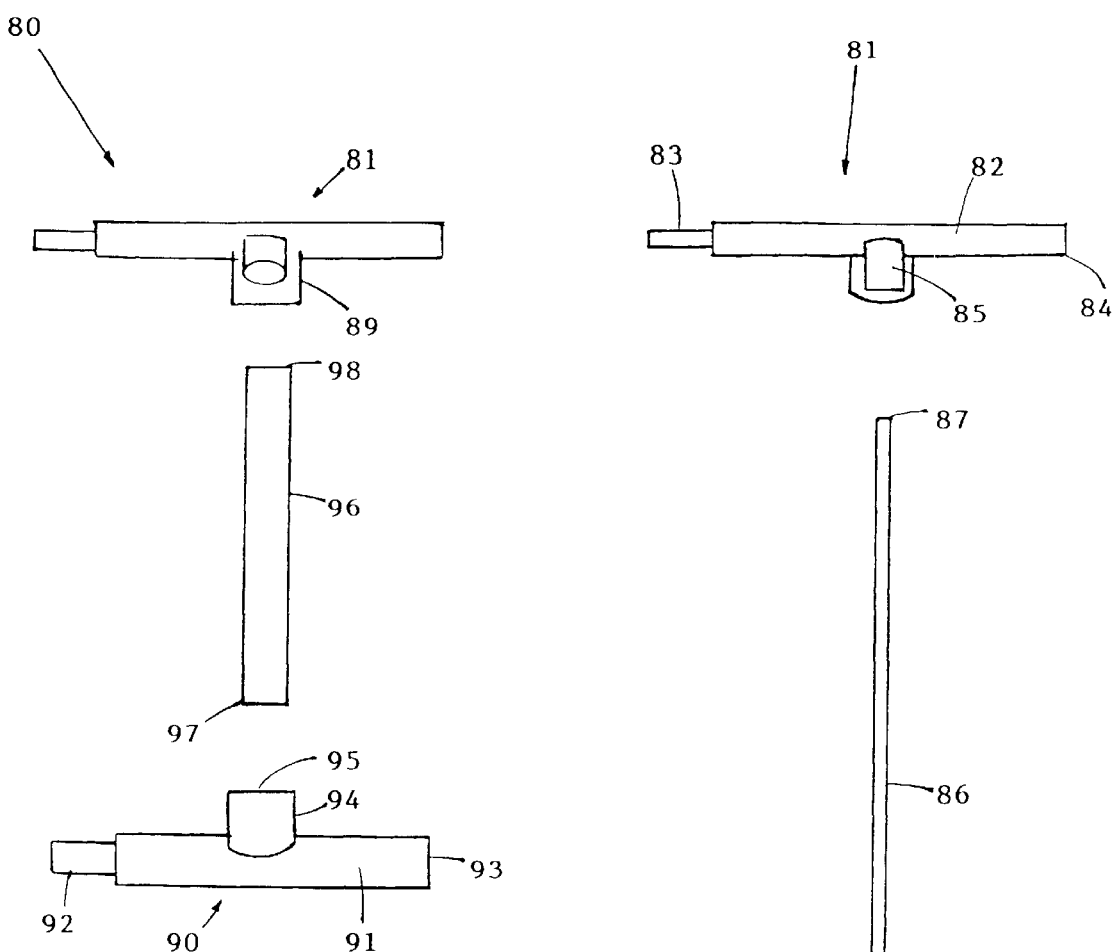
FIG. 5c
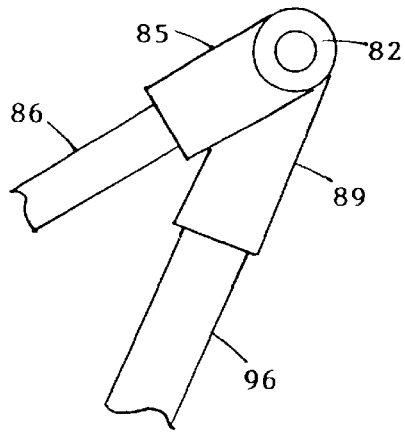
FIG. 5b
FIG. 5a

EXPANDABLE JOGGING STROLLER

CROSS REFERENCE TO RELATED APPLICATION

This application is based on Provisional Patent Application Serial No. 60/238,117, filed Oct. 6, 2000.

BACKGROUND OF THE INVENTION

1. Field of the Invention

The present invention relates generally to strollers for infants and small children, and more specifically to a stroller adapted particularly to outdoor use and which enables a parent to jog or exercise while pushing the stroller. The present invention is designed to have the ability to expand from a single seat to a multiple seat stroller or vice versa by the use of a conversion kit.

2. Description of the Prior Art

With the resurgence of physical fitness, persons of all ages, including the parents of infants and young children have developed great interest in all forms of physical exercise, particularly in jogging and walking at relatively high speeds. Infants and small children certainly cannot be left unattended for any period of time, therefore it has become popular for parents to use jogging strollers to take the child or children along on the jog. Infant jogging strollers have been the subject of prior art and have developed into highly engineered and popular items, especially among young parents.

To design a jogging stroller to navigate over the rough terrain on jogging trails requires the use of larger wheels, a much lighter chassis, and more shock absorption for the child than one would expect on a normal stroller. Such devices can be relatively expensive. Jogging strollers are available in single, double and even triple seat units. The double strollers are obviously slightly heavier and more expensive than that of a single seat design of similar quality. One would not usually purchase a double seat model, if there was no immediate need. Usually, a consumer first purchases a single seat model, and when the need to accommodate a second child arrives, they then purchase a double seat unit. There are excellent single and double units available, but it is an expensive expenditure when someone has to purchase an entirely new stroller to accommodate an extra child. The present invention seeks to provide an economic solution to this problem. It makes it possible to purchase a single seat stroller, and if and when the need arises for a second seat, the user need only to purchase a conversion kit, whereby the single seat unit can be converted into a double seat unit in a matter of minutes and without the need for very little mechanical skill. The cost savings are substantial as is the satisfaction that a perfectly good jogging stroller did not go to waste.

U.S. Pat. Nos. 418,780 and 402,597 issued to Everett are examples of double and single seat models and state of the art construction. Neither teaches the use of a conversion kit to alter the chassis from a single seat to a double or vice versa. It is anticipated that the occasion will also arise when a user may wish to convert from the double unit back to a single unit.

U.S. Pat. No. 5,695,212 issued to Hinkston on Dec. 9, 1997 is another example of a single seat unit, but again with no anticipation for converting to a double seat model.

U.S. Patent issued to Nelson on Oct. 8, 1996, does disclose the ability to add one or two seats to the same stroller chassis. This patent teaches the use of a car seat as the seat on the jogging stroller. But even though it discloses the addition or removal of the second seat, the user is inconvenienced by a much larger chassis when only one seat is wanted. This can be extremely important in cases where the added weight and size is a detriment to the serious jogger.

None of the above inventions and patents, either singly or in combination, is seen to describe the instant invention as claimed.

SUMMARY OF THE INVENTION

Accordingly, the above problems and difficulties are obviated by the present invention which provides for a three-wheel jogging stroller with the ability to be expanded to accommodate a second seat by means of a conversion kit.

The frame assembly includes a primary structural rear axle assembly having an enlarged diameter tubular construction which couples at opposite ends thereof for supporting removable large diameter pneumatic tires with axles thereof cantered so that the wheels are downwardly divergent relative to the ground. The rear axle assembly having pivotally coupled thereto a pair of upright support members and a pair of rods for supporting the removable front wheel at one end thereof, while at the other end, the rod members are pivotally coupled to the rear axle member by means of clevis type members, so that the pivotable coupling is displaced, or offset, a given distance from the axis of the rear axle member.

The handlebar assembly includes a first generally U-shaped handlebar member and a second tubular portion including left and right leg members having lower ends thereof flexibly connected to a front wheel assembly. The front wheel assembly supporting the front wheel and forming the structural integrity of the stroller by rotationally connecting the distal ends of the rods while the proximal ends of the rods are pivotally connected to the axle assembly.

Both the handle bar assembly and the rear axle assembly have means for separating and then installing an insert from the conversion kit which will thereby expand the width of the single seat stroller to that of a double seat unit. A couple of support members include: a center bar extending between the handlebar assembly and the front end assembly for providing support for the dual seats; and a brace between the handlebar and the rear axle assembly.

Accordingly, one of the objects of the present invention is to provide an improved jogging stroller which comprises a tricycle frame having a single seat arrangement which can be adapted to convert into a double seat stroller by utilization of a conversion kit.

Another of the objects of the present invention is to provide an improved jogging stroller which includes relatively large wheels preferably having a diameter of at least fifteen inches or more, in order to provide for ease of travel over uneven and rough terrain.

Yet another object of the present invention is to provide an improved jogging stroller in which at least some of the wheels are quickly and easily removable and installable without need for special tools.

Still another of the objects of the present invention is to provide an improved jogging stroller in which at least the horizontal tubular members are capable of being disconnected and of receiving interconnecting members for expanding the overall width of the chassis to accommodate a second seat.

Another object of the present invention is to provide an improved jogging stroller which frame is constructed of light weight tubing for durability and strength.

A final object of the present invention is to provide an improved jogging stroller for the purposes described which is inexpensive, dependable and fully effective in accomplishing its intended purpose.

These and other objects of the present invention will become readily apparent upon further review of the following specification and drawings

BRIEF DESCRIPTION OF THE DRAWINGS

FIG. 5a is top view of the handlebar insert and center bar of the conversion kit.

FIG. 5b is a side view of FIG. 5a.

FIG. 5c is a top view of the axle insert and brace member of the conversion kit.

DETAILED DESCRIPTION OF THE PREFERRED EMBODIMENT

The present invention provides a conversion kit 80 for converting an ordinary single seat jogging stroller to a double seat unit by inserting a few friction fitting mechanical procedures requiring no tools or exceptional mechanical ability. The utilization of a conversion kit 80, at a fraction of the price of what a new double seat stroller would cost, is the main inventive concept of the present invention.

Figure 1:
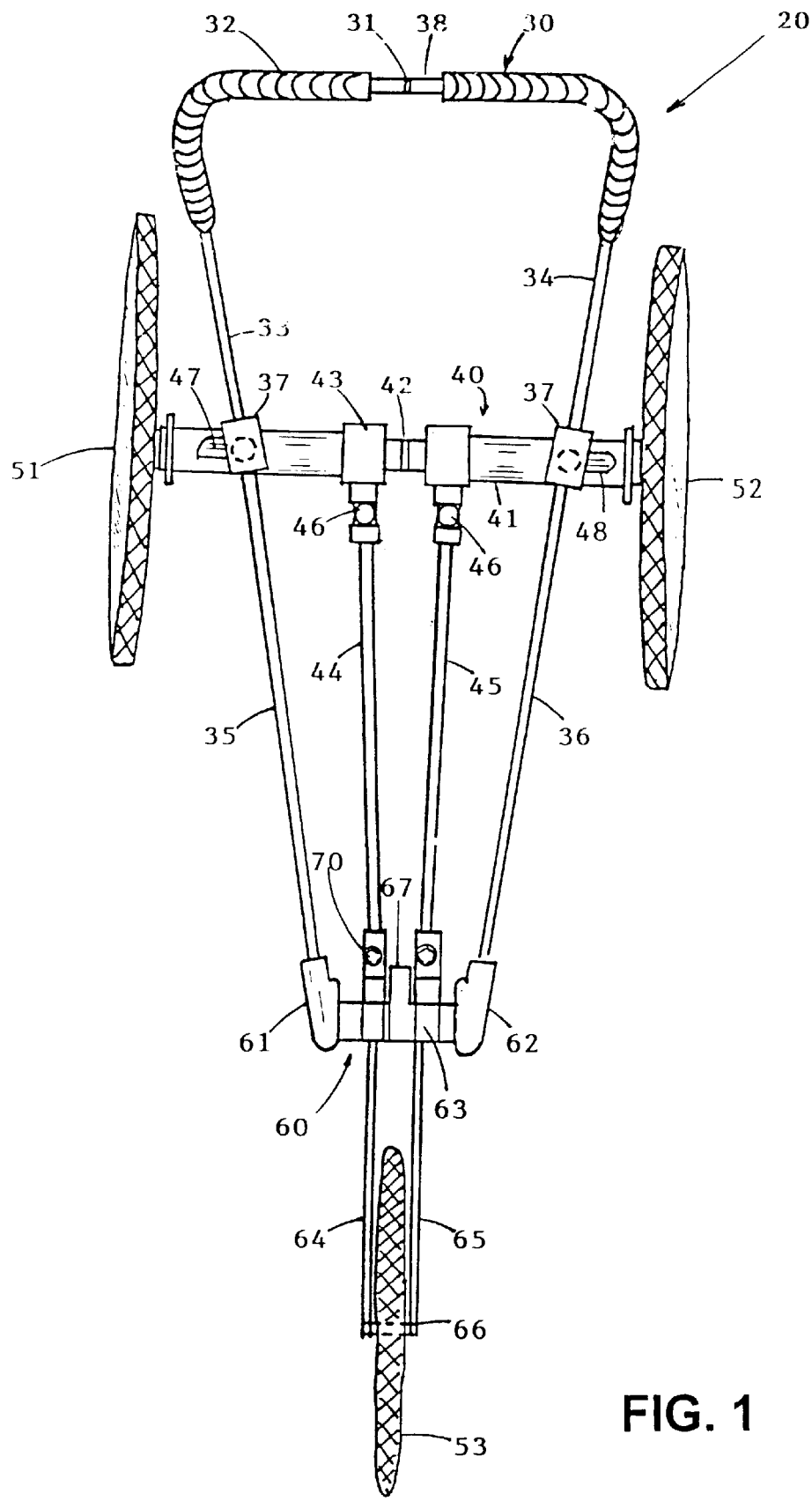
FIG. 1 is top view of a single seat stroller frame, showing its general configuration when being operated as a single seat unit. Seams are indicated where the conversion kit will be installed.
Figure 2:
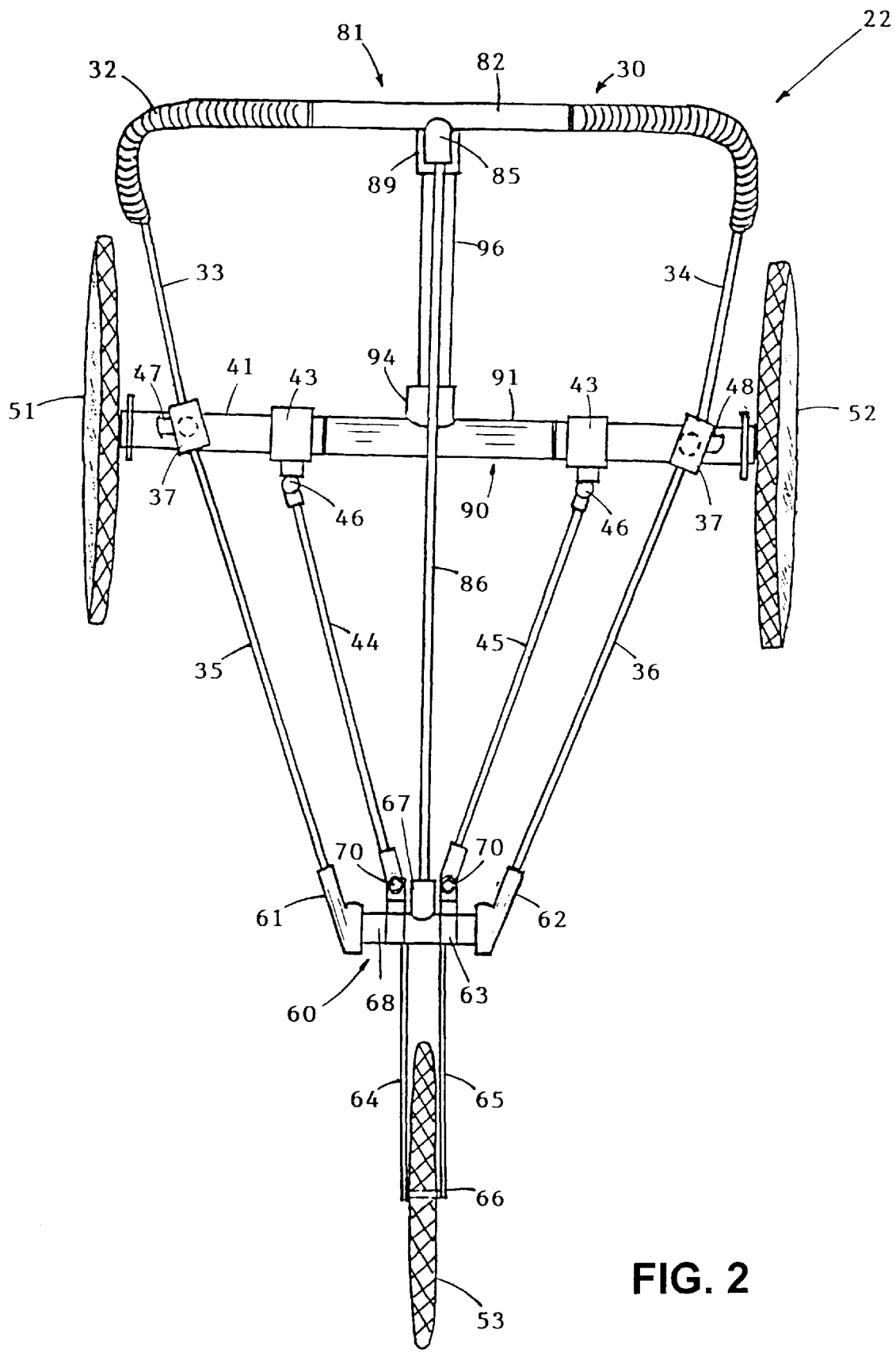
FIG. 2 is a top view of the stroller frame of FIG. 1 after being converted by the conversion kit to a double seated unit.

Referring now to the drawings, and particularly to FIGS. 1 and 2, there is shown a three-wheeled jogging stroller, a single seat unit generally designated as 20, and a double seat stroller designated as 22. Both strollers 20 and 22 include: a front wheel assembly 60 comprising a front wheel frame 53; a rear axle assembly 40 having an elongated axle 41 which further has opposite ends supporting a pair of pneumatic tire wheel frames, a left wheel frame 51 and a right wheel frame 52; and a two-part U-shaped tubular handlebar assembly 30 which includes a first part having a pair of arm members, a left arm 33 and a right arm 34, each arm having a distal end terminating in a folding coupling 37, and a second part comprising of a pair of leg members, a left leg 35 and a right leg 36 interconnecting between folding couplings 37 and front wheel assembly 60. Folding couplings 37 are generally saddle-shaped and configured for enabling the two arms 33, 34 and legs 35 and 36 to be therefore folded.

In order to make the strollers convertible between either single or double seat models, the handlebar assembly 30 has in its gripping portion 32 a handlebar disconnect seam 31, wherein friction fitting means is incorporated to permit the user to disengage the handlebar assembly 30 for easy installation of one the conversion kit parts (discussed below). The grip itself will be covered with a rubberized grasping material.

The other insert of the kit 80 involves the structural axle assembly 40 including axle 41 having a diameter between about 2.5 inches to 4.0 inches which includes an axle disconnect seam 42 which enables axle 41 to be disengaged for the installation of the appropriate part from the conversion kit 80 (to be discussed later). The structural support between axle 41 and front wheel assembly 60 is accomplished by a pair of elongated rods, a left rod 44 and a right rod 45. A pair of axle couplers 43 having means for fitting to axle 41 and each having a pivoting member 46 connected to one of the ends of the rods 44, 45. The other ends of the rods 44, 45, being connected to front wheel assembly 60 by a pair of knuckle members 70.

The front wheel assembly 60 comprises a generally tubular elongated housing 68, each end having flexible leg sockets, a left leg socket 61 and a right leg socket 62. Each socket 61, 62, having a female type friction-fitting means for connection to one of the ends of the legs 35, 36. A pair of fixed front rod couplers 63, have means for attachment to the tubular housing 68, each having a portion for a friction-fitting engagement with one of the knuckle members 70. A front end sleeve 67 extends outwardly from housing 68 and towards handlebar assembly 30 for engagement with the appropriate part of the conversion kit 80. Front wheel assembly 60 provides the structural integrity for front wheel frame 53 by means of a pair of fork-like supports, a left support 64 and a right support 65, each support extending outwardly from the housing 68 and having connecting means 66 for supporting front wheel frame 53 and properly maintaining the alignment therein.

Figure 3:
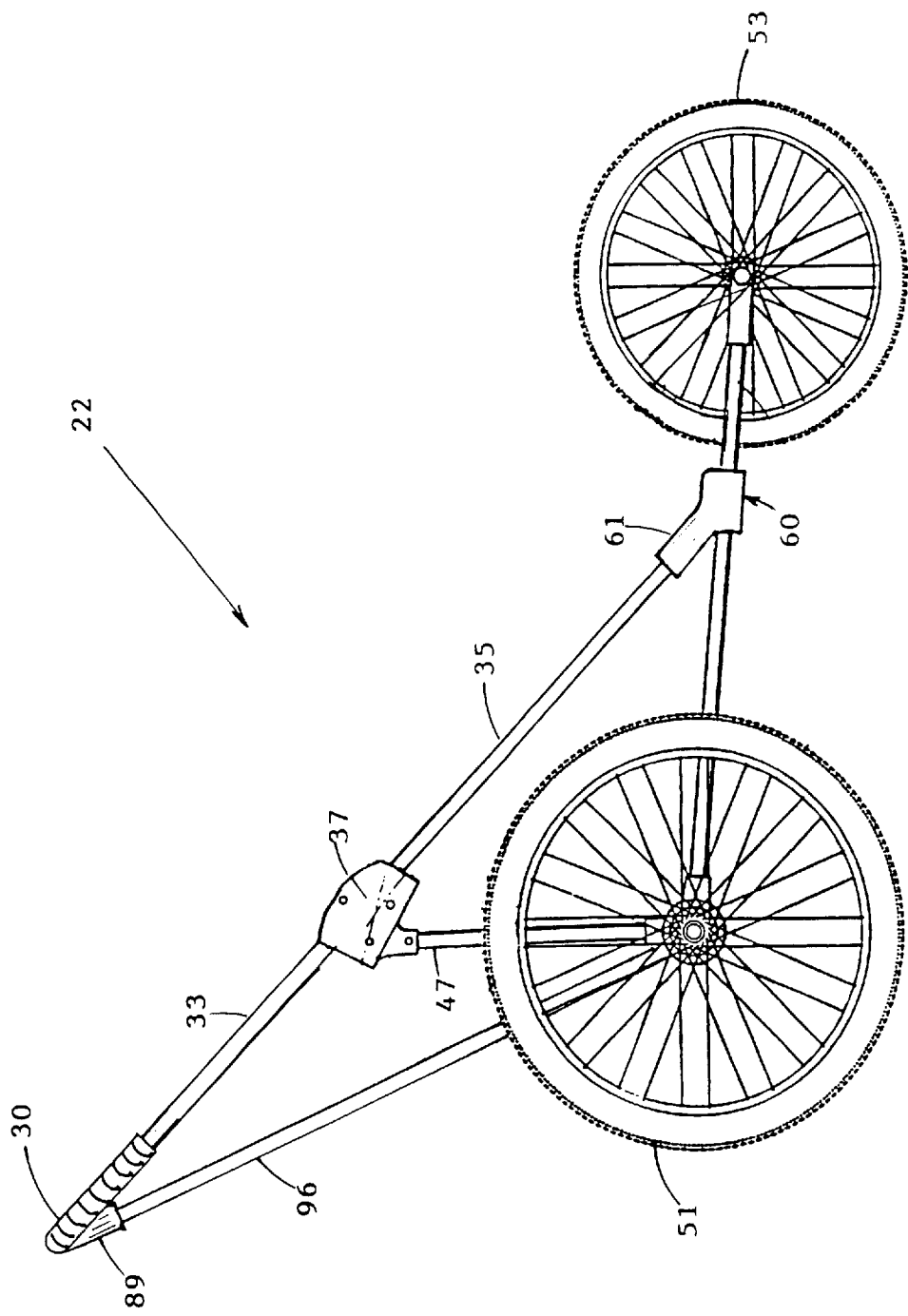
FIG. 3 is a side view of the stroller of FIG. 2.

Providing the vertical structural support are a pair of generally vertical tubular strut members, a left strut 47 and a right strut 48, illustrated in FIG. 3, both being attached at their lower ends to rear axle 41, and at their upper ends to like configured interconnects in folding couplings 37. Struts 47, 48, thereby interconnecting between axle tube 41 and folding couplings 37.

Figure 4A:
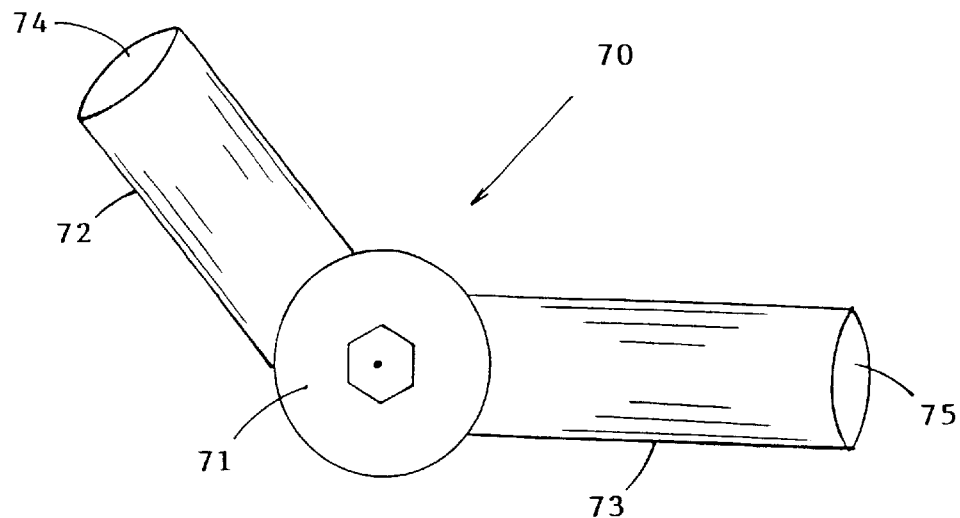
FIG. 4a is a top view of the knuckle member.
Figure 4B:
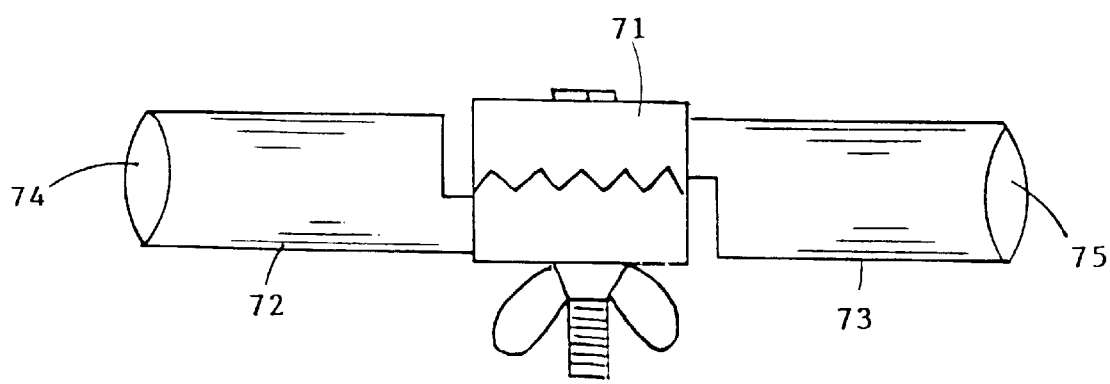
FIG. 4b is an elevation view of the knuckle member.

FIGS. 4a and 4b illustrate the knuckle members 70. Each knuckle member 70 is comprised of: a rotation portion 71 in the generally middle area; on one side a rod sheath 72 having an opening 74 for connection by friction-fitting means to one of the rods 44 or 45; and on the other side a housing connection sheath 73 having an opening 75 for connection by friction fitting means to one of the couplers 63. The knuckle members 70 provide the ability for the stroller to rotate between the angles required for the conversion of the single seat model 20 to the double seat model 22 as explained below.

The main inventive concept of the present invention is providing the conversion kit 80 to interchange between the single seat unit 20 and the double seat unit 22. As shown in FIGS. 5a, 5b and 5c, kit 80 includes a handlebar insert 81, an axle insert 90, a center bar 86 and a brace member 96. The conversion will only take minutes and tools are not required. The conversion is actuated by first disconnecting the handlebar assembly 30 is disconnected at the seam 31, which is located in handlebar tube 38.

Then axle 41 is disconnected at its seam 42, thereby allowing stroller 20 to be spread apart to accommodate an additional seat. Handlebar insert 81 comprises a generally hollow main structural body 82, having at one end a male section 83 and at the other end a female section 84, each having means for friction-fitting with one of the disconnected portions of handlebar tube 38. Extending obliquely from body 82 are a pair of sleeves, a center bar sleeve 85 and a brace sleeve 89, each having friction-fitting connection means for connecting to the center bar 86 and to the brace member 96 respectively. Center bar 86 having a proximal end 87 which is received in sleeve 85 and a distal end 88 which is similarly received in front end sleeve 67, thereby providing both structural support as well as support for the pair of seats disposed in the center of stroller 22. For purposes of clarity, the seats are not shown in the drawings. They are snapped into the frame by conventional means well known to those skilled in the art. The axle insert 90 supports the additional weight and structure of the two seat stroller 22 and is installed into axle seam 42 of axle 41. Axle insert 90 has a construction generally similar to handlebar insert 81, however it has only one outwardly extending brace sleeve 94. Again a male section 92 at one end of axle insert body 91 and a female section 93 at the other end engage in a friction-fit with the disconnected ends of axle 41. Extending upwardly away from axle insert body 91 is a brace sheath 94 having an opening 95 therein for receiving brace member 96 in a friction-fit. Brace member 96 having a lower end 97 for connecting within the brace sheath 94 and an upper end 98 for friction fitting with the brace sleeve 89 of handlebar insert 81.

The installation of handlebar insert 81, axle insert 90, connecting bar 86, brace member 96, and an additional seat that can be snapped into place (seat not shown) makes the conversion to a double seat model 22 complete. To convert back to a single seat model 20, the reverse procedure is required. Either way the procedure consists of disconnecting snap-fitting connections and then snap-fitting new connections. The entire process will only take a few minutes and tools are not required.

For the purposes of simplicity and clarity many of the very necessary elements of a jogging stroller, such as the brake lever which is normally located on the handlebar assembly, and the associated caliper type brake which engages the rim of the front wheel frame, have not been shown. While the description has utilized directional references, such as upper, lower, right and left, it is to be understood that these terms are utilized with reference to the orienting of the figures and not intended to be limiting. The construction of jogging strollers 20, 22, is preferably of aluminum tubing which, with the exception of axle 41, are all of the same diameter, thus effecting economies of assembly. Furthermore, with the exception of handlebar tube 38, all the tubular stock consists of straight or linear lengths of material.

It is to be understood that the present invention is not limited to the sole embodiments described above, but encompass any and all embodiments within the scope of the following clams.

I claim:

1. A jogging stroller expandable from a single seat unit to a dual seat unit, the stroller comprising:
   (a) a U-shaped handlebar assembly having:
      a gripping portion having a disconnect seam therein for opening and spreading the handlebar apart,
      a handlebar insert interposed within the gripping portion disconnect seam for creating a wider handlebar assembly to accommodate an extra seat;
   (b) a rear axle assembly having:
      an axle having opposite ends, each end supporting a large pneumatic tire, the axle having a disconnect seam therein for opening and spreading the axle apart,
      an axle insert interposed within the axle disconnect seam to create a wider axle assembly,
      means for connecting the handlebar assembly to the rear axle assembly;
   (c) a front wheel assembly including:
      a front wheel frame,
      a housing having a front end sleeve,
      means for connecting the handlebar assembly to the front wheel assembly,
      means for connecting the rear axle assembly to the front wheel assembly;
   (d) a center bar, having a proximal end connected to the handlebar insert and a distal end connected to the front end sleeve of the housing, for providing longitudinal structural support for the stroller when the stroller is in the dual seat mode; and
   (e) a brace member, a lower end friction-fitted to the axle insert and an upper end friction-fitted to the handlebar insert, for providing vertical support for stroller in the dual seat mode.

2. The jogging stroller according to claim 1, wherein the handlebar insert comprises:
   an elongated tubular body having opposing male and female sections for friction fitting with the gripping portions of the handlebar seam;
   the handlebar insert having a pair of downwardly descending sleeves, one sleeve for connecting to the proximal end of the center bar and the other sleeve for connecting to the upper end of the brace member.

3. The jogging stroller according to claim 1, wherein the axle insert comprises:
   an elongated tubular body having opposing male and female sections for friction-fitting within the expanded axle disconnect seam;
   the axle insert having an upwardly projecting sleeve for connecting to the lower end of the brace member.

4. The jogging stroller according to claim 1, wherein the means for connecting the rear axle assembly to the handlebar assembly includes:
   a pair of arms each downwardly descending from the handlebar, each arm having a distal end terminating in a folding coupling; and
   a pair of strut members vertically extending from the axle, each strut having an upper end connecting to one of the folding couplings.

5. The jogging stroller according to claim 1, wherein the means for connecting the handlebar assembly to the front end assembly includes:
   the housing of the front end assembly having a pair of flexible leg sockets; and
   the handlebar assembly having a pair of leg members, each leg member having one end connected to one of the folding couplings and their other end friction-fitted within one of the flexible leg sockets.

6. The jogging stroller according to claim 1, wherein the means for connecting the rear axle assembly to the front wheel assembly includes:
   the housing of the front end having a pair of rotating knuckle members, each knuckle member having a sheath;
   the rear axle assembly having a pair of pivoting members attached to the axle; and
   a pair of elongated rods, each rod having one end connected to one of the pivoting members and the other end connected to the sheath of one of the knuckle members.

7. A jogging stroller in combination with a conversion kit for converting a single seat stroller into a dual seat stroller, the stroller comprising:

a U-shaped handlebar assembly including a gripping portion having a disconnect seam therein for opening and spreading the handlebar apart;

a rear axle assembly having an axle, the axle having opposite ends, each end supporting a large pneumatic tire, the axle further having a disconnect seam therein for opening and spreading the axle apart;

a front wheel assembly including a front wheel frame, the front wheel assembly further having a housing;

means for connection and support of the handlebar assembly to the rear axle assembly;

means for connection and support of the handlebar assembly to the front wheel assembly; and means for connection and support of the rear axle assembly to the front wheel assembly;

wherein the conversion kit includes:
- a handlebar insert having means for interposing within the opened handlebar seam;
- an axle insert having means for interposing within the opened axle seam;
- a brace member having an upper end with means for friction-fitting to the handlebar insert and a lower end with means for friction-fitting to the rear axle assembly, to provide vertical support for the stroller in the dual seat mode; and
- a center bar having means for connecting a proximal end to the handlebar insert and means for connecting a distal end to the front end assembly, for providing longitudinal structural support to the stroller in the dual seat mode.

8. The jogging stroller according to claim 7, wherein the means for connecting and supporting the handlebar assembly to the rear axle assembly includes:
- a pair of arms each downwardly descending from the handlebar, each arm having a distal end terminating in a folding coupling; and
- a pair of strut members vertically extending from the axle, each having an upper end connecting to one of the folding couplings.

9. The jogging stroller according to claim 7, wherein the means for connecting and supporting of the handlebar assembly to the front wheel assembly includes:
- the housing of the front end assembly having a pair of flexible leg sockets; and
- the handlebar assembly having a pair of leg members, each leg member having one end connected to one of the folding couplings and their other end friction-fitted within one of the flexible leg sockets.

10. The jogging stroller according to claim 7, wherein the means for connecting the rear axle assembly to the front wheel assembly includes:
- the housing of the front end having a pair of rotating knuckle members, each knuckle member having a sheath;
- the rear axle assembly having a pair of pivoting members attached to the axle; and
- a pair of elongated rods, each rod having one end connected to one of the pivoting members and the other end connected to the sheath of one of the knuckle members.

* * * * *